United States Patent
Zhang et al.

(10) Patent No.: US 10,929,121 B2
(45) Date of Patent: Feb. 23, 2021

(54) METHOD, DEVICE AND RELATED SYSTEM FOR DYNAMICALLY REPAIRING APPLICATION

(71) Applicant: Alibaba Group Holding Limited, Grand Cayman (KY)

(72) Inventors: Zhijian Zhang, Guangzhou (CN); Miaokui Ma, Guangzhou (CN)

(73) Assignee: ALIBABA GROUP HOLDING LIMITED, George Town (KY)

(*) Notice: Subject to any disclaimer, the term of this patent is extended or adjusted under 35 U.S.C. 154(b) by 0 days.

(21) Appl. No.: 15/772,991

(22) PCT Filed: Oct. 31, 2016

(86) PCT No.: PCT/CN2016/103939
§ 371 (c)(1),
(2) Date: May 2, 2018

(87) PCT Pub. No.: WO2017/076244
PCT Pub. Date: May 11, 2017

(65) Prior Publication Data
US 2018/0321932 A1    Nov. 8, 2018

(30) Foreign Application Priority Data
Nov. 2, 2015   (CN) .......................... 201510742193.2

(51) Int. Cl.
*G06F 8/656*   (2018.01)
*G06F 8/71*    (2018.01)
*G06F 9/445*   (2018.01)

(52) U.S. Cl.
CPC ............... *G06F 8/656* (2018.02); *G06F 8/71* (2013.01); *G06F 9/44505* (2013.01)

(58) Field of Classification Search
CPC ......... G06F 8/656; G06F 8/71; G06F 9/44505
(Continued)

(56) References Cited

U.S. PATENT DOCUMENTS

| 4,752,870 A | * | 6/1988 | Matsumura | ........... | G06F 9/4416 |
| | | | | | 709/211 |
| 5,938,774 A | * | 8/1999 | Hsu | .......................... | G06F 9/328 |
| | | | | | 714/10 |

(Continued)

FOREIGN PATENT DOCUMENTS

| CN | 103605551 | 2/2014 |
| CN | 103677937 | 3/2014 |

(Continued)

OTHER PUBLICATIONS

International Search Report and Written Opinion for International Application No. PCT/CN2016/103939 dated Jan. 24, 2017, 2 pages.

*Primary Examiner* — Chat C Do
*Assistant Examiner* — Bradford F Wheaton
(74) *Attorney, Agent, or Firm* — Alston & Bird LLP

(57) ABSTRACT

Disclosed is a method for dynamically repairing an application, which includes: a client receiving a pre-configured repaired program segment; the repaired program segment is stored; an address that stores the repaired program segment is recorded; the address of the repaired program segment is stored in an application APP, and when the APP is in operation, the APP calling the repaired program segment via the address of the repaired program segment. Correspondingly, the present invention further discloses a device for dynamically repairing an application and a related system.

25 Claims, 5 Drawing Sheets

(58) Field of Classification Search
USPC .......................................................... 717/128
See application file for complete search history.

(56) References Cited

U.S. PATENT DOCUMENTS

| | | | |
|---|---|---|---|
| 7,472,133 B2* | 12/2008 | Freedman | G06F 16/2453 |
| 2008/0136802 A1* | 6/2008 | Chuang | G06F 3/14 |
| | | | 345/205 |
| 2008/0229326 A1* | 9/2008 | Beckwith | H04L 67/2809 |
| | | | 719/313 |
| 2008/0288928 A1* | 11/2008 | Bowers | G06F 8/41 |
| | | | 717/136 |
| 2009/0089507 A1* | 4/2009 | Chen | G06F 8/433 |
| | | | 711/125 |
| 2011/0125900 A1* | 5/2011 | Janssen | G05B 19/042 |
| | | | 709/225 |
| 2011/0252414 A1 | 10/2011 | Chiu et al. | |
| 2016/0154644 A1* | 6/2016 | Chhawchharia | G06F 8/71 |
| | | | 717/107 |
| 2016/0299754 A1* | 10/2016 | Wei | H04W 4/023 |
| 2016/0314025 A1* | 10/2016 | McGarry | G06F 9/542 |

FOREIGN PATENT DOCUMENTS

| | | |
|---|---|---|
| CN | 103995721 | 8/2014 |
| CN | 104866307 | 8/2015 |

* cited by examiner

METHOD, DEVICE AND RELATED SYSTEM FOR DYNAMICALLY REPAIRING APPLICATION

CROSS-REFERENCE TO RELATED APPLICATION

The present invention claims priority to and the benefit of PCT/CN2016/103939, filed Oct. 31, 2016, which claims priority to Chinese Patent Application No. 201510742193.2, filed with the Chinese Patent Office on Nov. 2, 2015, and entitled Method, Device And Related System For Dynamically Repairing Application, the entire contents of which are incorporated in their entireties herein by reference.

TECHNICAL FIELD

The present invention relates to the field of Internet technologies, and more particularly, to a method, a device, and a related system for dynamically repairing an application.

BACKGROUND ART

It is well known that the operation of a mobile terminal depends on a built-in operating system. In view of the features of convenience and ease of operation of the mobile terminal, people are increasingly inclined to conduct network activities through the mobile terminal. Therefore, in order to meet the needs of users, and at the same time increase the flexibility of use of the mobile terminal, based on the operating system of the mobile terminal, the third-party server has been developed with a variety of APPs (applications) that can implement different functions. When a user wants to perform a type of activity through the mobile terminal, an APP that can implement the corresponding function can be installed on the mobile terminal.

Specifically, taking the IOS system as an example, since an APP is a third-party application developed for a third-party server, after the third-party server develops an APP, it needs to go through an approval process by the client's IOS system. After the IOS system approves this application, the APP will be released in the APP Store. After that, when a user needs to use the APP, it can be downloaded from the APP Store.

However, the process of a client IOS system reviewing an APP is relatively long, which usually takes about 7 days. In addition, if some functions of the application are found to contain errors after the APP is released, the APP has to go offline and to then repair the errors. The repaired APP needs to be reviewed again and then rereleased. The entire process will take a very long time, resulting in a more expensive APP, an increase in the crash rate, and a serious impact on the user experience.

SUMMARY OF THE INVENTION

In view of the foregoing, one or more embodiments of the present invention provide a method, a device, and a related system for dynamically repairing an application. The embodiments of the present invention aim to solve the problem of the long period of time needed in order to repair an error in an APP after the APP is released.

In a first aspect, the one or more embodiments of the present invention provide a method for dynamically repairing an application, which comprises the following steps: a client receives a pre-configured repaired program segment; the repaired program segment is stored; an address that stores the repaired program segment is recorded; the address of the repaired program segment is stored in an application APP, and when the APP is in operation, the APP calls the repaired program segment via the repaired program segment address.

In a first possible implementation of the first aspect, the step of storing the address of the repaired program segment in an application APP includes: creating a storage node corresponding to the address of the repaired program segment in the APP; writing the address of the repaired program segment to the storage node created.

In combination with the first aspect, in a second possible implementation, the step of storing the address of the repaired program segment in an application APP further includes: reading the storage node corresponding to the address of the program segment to be repaired from the APP, wherein the program segment to be repaired is a program segment prior to the repaired program segment; writing the address of the repaired program segment to the storage node corresponding to the address of the program segment to be repaired, such that the address of the program segment to be repaired is replaced by the address of the repaired program segment.

In combination with the first aspect, in a third possible implementation, the step of creating a storage node corresponding to the address of the repaired program segment in the APP includes: reading the identification information of the repaired program segment; searching the APP for the address of a functional module to which the repaired program belongs according to the identification information; determining a storage node corresponding to the address of the functional module; adding a sub-storage node to the storage node corresponding to the address of the functional module, and using the sub-storage node as the storage node of the address of the repaired program segment.

In combination with the first aspect, in a fourth possible implementation, the step of reading the storage node corresponding to the address of the program segment to be repaired from the APP includes: reading the identification information of the repaired program segment; searching the APP for the address of the functional module to which the repaired program belongs according to the identification information; determining the storage node corresponding to the address of the functional module; searching the storage node corresponding to the address of the program to be repaired from the sub-storage node using the storage node corresponding to the address of the functional module as a root storage node.

In combination with the first aspect, in a fifth possible implementation, the step of reading the storage node corresponding to the address of the program segment to be repaired from the APP includes: reading the identification information of the repaired program segment; searching for the functional module to which the repaired program segment belongs according to the identification information; determining the program segment to be repaired from the functional module; adding a storage address to the program segment to be repaired; determining that the storage node corresponding to the storage address of the added program segment to be repaired is the storage node corresponding to the address of the program segment to be repaired.

In a second aspect, the one or more embodiments of the present invention further provide a method for dynamically repairing an application, which includes the following steps: a server receives a connection request for running an application system APP, wherein the connection request comprises a current version number of the APP; when the current version number is lower than the highest version number, a repaired program segment corresponding to the APP is configured; the repaired program segment is sent to a client, and the client stores the repaired program segment; an address for storing the repaired program segment is obtained; the address of the repaired program segment to the APP is stored, so as to facilitate the client calling the repaired program segment via the address of the repaired program segment when the APP is running.

In a first possible implementation of the second aspect, the step of configuring a repaired program segment corresponding to the APP includes sequentially obtaining a different program segment from the APP from an APP whose version number is higher than the current version number; adding identification information to the program segment according to an attribute value thereof, determining the program segment with the added identification information to be the repaired program segment.

In a third aspect, the one or more embodiments of the present invention further provide a device for dynamically repairing an application, which includes: a receiving module for receiving a pre-configured repaired program segment; a storing module for storing the repaired program segment received by the receiving module; a recording module for recording the address of the repaired program segment stored by the storing module; the storing module is further configured to store the address of the repaired program segment recorded by the recording module in the application program APP, and the APP program calls the repaired program segment through the address of the repaired program segment.

In a first possible implementation of the third aspect, the storing module includes: a creating unit and a writing unit, in which the creating unit is used for creating a storage node corresponding to the address of the repaired program segment in the APP; the writing unit is used for writing the address of the repaired program segment to the storage node created.

In combination with the third aspect, in a second possible implementation, the storing module further includes a reading unit, in which the reading unit is used for reading the storage node corresponding to the address of the program segment to be repaired from the APP, where the program segment to be repaired is a program segment prior to the repaired program segment; the writing unit is further used for writing the address of the repaired program segment to the storage node corresponding to the address of the program segment to be repaired, such that the address of the program segment to be repaired is replaced by the address of the repaired program segment.

In combination with the third aspect, in a third possible implementation, the creating unit includes a first reading sub-unit, a first searching sub-unit, a first determining sub-unit, and a first adding sub-unit, in which the first reading sub-unit is used for reading the identification information of the repaired program segment; the first searching sub-unit is used for searching the APP for the address of a functional module to which the repaired program belongs according to the identification information; the first determining sub-unit is used for determining a storage node corresponding to the address of the functional module; and the first adding sub-unit is used for adding a sub-storage node to the storage node corresponding to the address of the functional module, and using the sub-storage node as the storage node of the address of the repaired program segment.

In combination with the third aspect, in a fourth possible implementation, the reading unit includes a second reading sub-unit, a second searching sub-unit and a second determining sub-unit, in which the second reading sub-unit is used for reading the identification information of the repaired program segment; the second searching sub-unit is used for searching the APP for the address of the functional module to which the repaired program belongs according to the identification information; the second determining sub-unit is used for determining the storage node corresponding to the address of the functional module; and the second searching sub-unit is further used for searching the storage node corresponding to the address of the program to be repaired from the sub-storage node using the storage node corresponding to the address of the functional module as a root storage node.

In combination with the third aspect, in a fifth possible implementation, the reading unit includes a second adding sub-unit, in which the second searching sub-unit is further used for searching for the functional module to which the repaired program segment belongs according to the identification information; the second determining sub-unit is used for determining the program segment to be repaired from the functional module; the second adding sub-unit is used for adding a storage address to the program segment to be repaired; the second determining sub-unit is used for determining that the storage node corresponding to the storage address of the added program segment to be repaired is the storage node corresponding to the address of the program segment to be repaired.

In a fourth aspect, the one or more embodiments of the present invention further provide a device for dynamically repairing an application, which includes: a receiving module, which is used for receiving a connection request for running an application system APP, wherein the connection request comprises a current version number of the APP; a configuring module, which is used for configuring a repaired program segment corresponding to the APP, when the current version number is lower than the highest version number; and a sending module, which is used for sending the repaired program segment to a client.

In a first possible implementation of the fourth aspect, the configuring module includes an obtaining unit, an adding unit and a determining unit, in which the obtaining unit is used for sequentially obtaining a different program segment from the APP from an APP whose version number is higher than the current version number; the adding unit is used for adding identification information to the program segment according to an attribute value thereof; and the determining unit is used for determining the program segment with the added identification information to be the repaired program segment.

In a fifth aspect, the one or more embodiments of the present invention further provide a system for dynamically repairing an application, which includes: a server and a client, where the server is sued for receiving a connection request for running an application system APP, where the connection request comprises a current version number of the APP; when the current version number is lower than the highest version number, configuring a repaired program segment corresponding to the APP, and sending the repaired program segment to the client; the client is used for receiving a pre-configured repaired program segment, storing the repaired program segment; recording an address that stores the repaired program segment; storing the address of the repaired program segment to the APP, so as to facilitate calling the repaired program segment via the address of the repaired program segment when the APP is running.

In light of the foregoing technical solutions, it can be known that the embodiments of the present invention provide a method, a device, and a related system for dynamically repairing an application. When an APP needs to be repaired, the client receives a pre-configured repaired program segment from the server, records the address of the repaired program segment after storing the repaired program segment, and stores the address of the repaired program segment in the APP. During the process of running the APP, the repaired program segment is found by searching the address of the repaired program segment, and the repaired program segment is thus executed. Therefore, compared with the prior art, the technical solutions of the embodiments of the present invention can repair the APP online, thereby avoiding the time consumed by taking the application offline, repairing it, and then reapproving the repaired APP. As a result, this is able to reduce the cost of the APP. Optionally, the present invention is able to reduce the crash rate. In addition, it also can improve the user experience.

BRIEF DESCRIPTION OF THE DRAWINGS

In order to more clearly describe the technical solutions of the embodiments of the present invention or the technical solutions in the prior art, the drawings to be used in the embodiments of the present invention will be briefly described below. Apparently, the drawings in the following description are only some of the embodiments of the present invention. To a person of ordinary skill in the art, other drawings can also be obtained based on these drawings without any inventive skills. The objects described above and other objects of the present invention, as well as the features and advantages of the present invention will be more apparent and understandable. The same reference numerals denote the same parts throughout the drawings. It is noted that the drawings are not intentionally scaled in accordance with actual dimensions, and the emphasis is on illustrating the principles of the present invention.

DESCRIPTION OF THE EMBODIMENTS

In the following, the embodiment according to the present invention will be further described taking the IOS system as an example. However, a person skilled in the art should understand that other systems may have similar situations to the IOS system, and the embodiments of the present invention can also be applied to the other systems.

The language used in the development of the IOS system is an Objective-C language (referred to as the OC language thereinafter in the embodiments of the present invention). APPs operated on the IOS systems are also developed using the OC language. When the program developed using the OC language is being executed, different functions can be achieved by means of calling different methods, and the different methods belong to different classes. In the case that a method needs to be called during the running of an APP, the class to which the method belongs is first determined, and then the method is searched from the class, and the found method is next called. The implementation program segments corresponding to the syntax, class, and method of the OC language are all stored in the memory of a mobile terminal, and the address of the stored program segment is correspondingly recorded in the APP. In this way, when the APP is running, it searches for and calls the relevant program segment by the address thereof. Based on the foregoing implementation process, in the technical solution of the embodiment of the present invention, the program segment called by the APP is changed by means of modifying the address of the program segment, so that the function of the APP is repaired.

The technical solutions in the embodiments of the present invention will be clearly and completely described with reference to the accompanying drawings in the embodiments of the present invention. Apparently, the embodiments described herein are merely a part of the embodiments of the present invention and are not all of the embodiments of the present invention. All other embodiments obtained by a person of ordinary skill in the art based on the embodiments of the present invention without inventive skills shall fall within the protection scope of the present invention.

In the technical solution of the embodiment of the present invention, the specific operation of repairing the APP is mainly completed on the client side. Therefore, in order to enable a person skilled in the art to accurately understand the present solution, the technical solution will be described from the perspective of the client.

Figure 1:
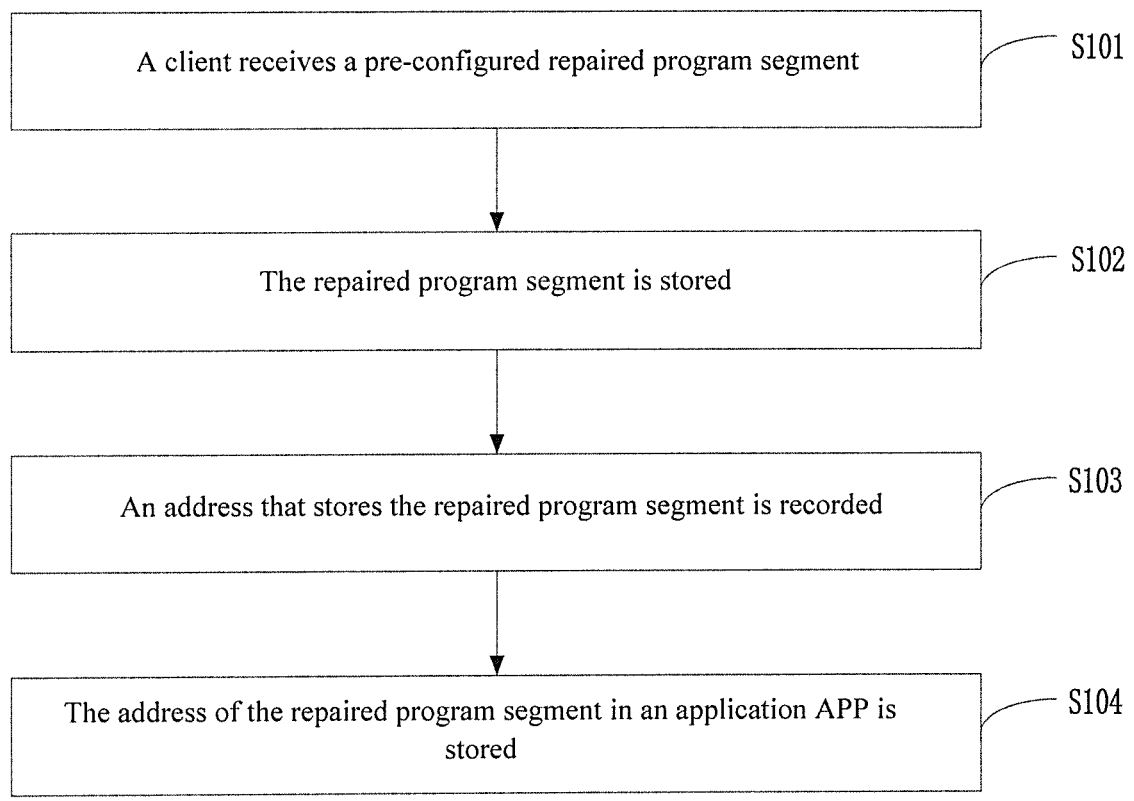
FIG. 1 is a flowchart of a method for dynamically repairing an application according to one or more embodiments of the present invention.

Please first refer to FIG. 1. FIG. 1 is a flowchart of a method for dynamically repairing an application according to one or more embodiments of the present invention. This embodiment will introduce an implementation method of the present invention as a whole, and the method includes the following steps.

Step S101, a client receives a pre-configured repaired program segment.

When the client runs an APP, the APP may send a connection request to the corresponding server through the client, where the connection request includes the version number of the APP. After reading the version number of the APP, the server may determine the program of the APP that needs to be repaired by using the version number of the APP, so as to pre-configure the corresponding repaired program segment of the APP and send it to the client. It should be noted that the process of configuring the repaired program segment by the server according to the version number of the APP will be described in detail in the description of the embodiments below, which will not be described in detail in this embodiment of the present invention.

Due to the fact that the process of executing an APP is a process of calling a number of different method program segments, the repaired program segment described in this solution can be regarded as a set of program segments, which includes at least one program segment, and each program segment corresponds to a method of implementation. In addition, in order to clarify the content represented by each program segment and the class it belongs to, the server may add identification information for each segment according to the attribute value or method name of the method represented by the program segment, for the client to identify the repaired program segment, so as to facilitate the client repairing the APP.

For example, when a user runs a browser on an iPhone, the browser of the current version number lacks the function of adding a control with respect to the browser of the latest version number. The server thus sends the execution program for adding the control to the client as a repaired program segment; and then the client, on the basis of the currently running browser, adds the program segment for adding the control.

Step S102, store the repaired program segment.

In the prior art, if the program developed by the OC language is directly modified, the IOS system can detect it and does not allow the execution of the modification operation, resulting in that the APP cannot be repaired online by directly modifying the OC language. In order to solve this problem, when an APP is being developed by people skilled in the art, a repair platform is pre-installed in the APP. The repair platform is written in a modifiable programming language of the IOS system, and thus can provide an environment for calling the OC language code.

Specifically, since the IOS system allows the execution of JavaScript code, in a preferred embodiment of the present invention, the repair platform can be written using JavaScript code. Of course, other languages meeting the above conditions may also be used for writing it, thus the specific language is not limited in this embodiment of the present invention.

In this embodiment, a repair platform written using JavaScript code is called a JS platform. When the JS platform receives the repaired program segment, it first stores the repaired program segment in the client memory, and then obtains the storage address of the repaired program segment in the memory. In this way, the server can use JavaScript code to write a repaired program segment, and the JS platform can recognize the received repaired program segment.

After the JS platform receives the repaired program segments and identifies each repaired program segment based on the identification information thereof, each repaired program segment is converted into a format that the APP can recognize and then store in the memory. When the APP is running, it can directly call the stored repaired program segment. Specifically, the method for converting a code format is a technology that is familiar to a person skilled in the art and will not be described herein in the embodiment of the present invention.

In this embodiment, by way of setting a repair platform, the repaired program segment for execution can be received when the APP is dynamically running, so that the rules of the IOS system can be satisfied and the APP can be dynamically repaired during the operation of the APP.

Step S103: record an address that stores the repaired program segment.

From the above description, it can be known that when the OC program is executed, the address of the method to be called is first searched for, and then the program corresponding to the method is found and then executed according to the read address. Therefore, after the JS platform stores the repaired program segment in the memory, it records and stores the address of the repaired program segment, so that the address of the repaired program segment can be stored in the corresponding location of the APP, and the repaired program can be read during the running of the APP. Segment address.

It should be noted that from the above description it can been seen that the repaired program segment is actually a collection of program segments, and the address of the repaired program segment described in this embodiment is specifically the storage address corresponding to each repaired program segment in the collection of the repaired program segments.

Step S104, store the address of the repaired program segment in an application APP.

In this embodiment, the APP can call the repaired program segment at runtime and then execute the repaired program segment. The APP is considered to have been repaired. After the JS platform stores the repaired program segment, the address of the repaired program segment is stored in the APP.

According to the above description, it can be known that in the program written in the OC language, a method belongs to a class. In this embodiment, the class may be regarded as a functional module to which the program segment belongs, and each functional module also corresponds to a storage address. During the execution of the APP, the address of the functional module is usually read first, and after the address of the functional module is determined, the address of the program segment is then determined. Therefore, in order to facilitate executing the operation of the APP in a more efficient way, the address of the functional module and the address of the program segment may be stored in the APP according to their specific affiliation. Specifically, each address corresponds to a storage node, and the storage node corresponding to the address of the functional module can be regarded as a root storage node. The storage node corresponding to the address of the program segment belonging to the functional module is a sub-storage node of the root storage node. This can clearly reflect the correspondence between these addresses. Therefore, in this embodiment, the address of the repaired program segment is written into the corresponding storage node in the APP.

It should be noted that the IOS system provides a runtime mechanism. The runtime mechanism refers to that the system will package or rebuild some reusable programs or instances into a "runtime" collection. Programs or instances in the "runtime" collection can be linked at a running time or called by any program. Therefore, the process of reading and calling the APP program and address from the JS platform in this embodiment can all be accomplished through a runtime mechanism. The method and process for a JS platform to call an APP program and an address through a runtime mechanism are well known to a person skilled in the art and will not be described herein in the embodiments of the present invention.

In addition, because the programming languages of the JS platform and the APP are different, the program formats that can be identified are also different. When the JS platform calls the corresponding program of the APP, the OC program first packages the program called by the JS platform according to a preset format, and then sends the packaged program to the JS platform. Specifically, the JS platform can use regular expressions to change all program calls to call a fixed _oc( ) function. That is, all of the programs called by the JS platform need to be packaged in the format of the _oc( )

function. More specifically, since the JavaScript language has the feature of automatically converting NSDictionary and JavaScript objects in the OC language, when the JS platform calls a program segment in the APP, the OC program can package the program called by the JS into an NSDictionary, and the class name, method name, and pointer of the program segment will be indicated in the NSDictionary, so that the JS platform can call any OC program.

It can be known from the description of this embodiment that, by setting the repair platform in the APP, the solution of the repaired program segment for execution can be received without violating IOS development rules, and dynamically repair the APP according to the repaired program segment, thereby being able to avoid the time needed for taking the APP offline, repairing it, and then reapproving the repaired APP.

In addition, the process of repairing an APP usually performs the following three operations on the APP, adding a program segment to the APP, deleting a program segment from the APP, and modifying some of the program segments in the APP. The description of the solution in the foregoing embodiment is relatively general. In order to allow a person skilled in the art to understand this solution more clearly, the technical solutions of the embodiments of the present invention will be described in detail below on the basis of the foregoing three types of repair operations.

It should be noted that the following embodiments are developed based on the foregoing embodiment and are also supplementary to the foregoing embodiment. Therefore, in the following embodiments, as for the same steps as the foregoing embodiment, they have been described in detail in the description of the foregoing embodiment and will not be further repeated in the following embodiments.

Figure 2:
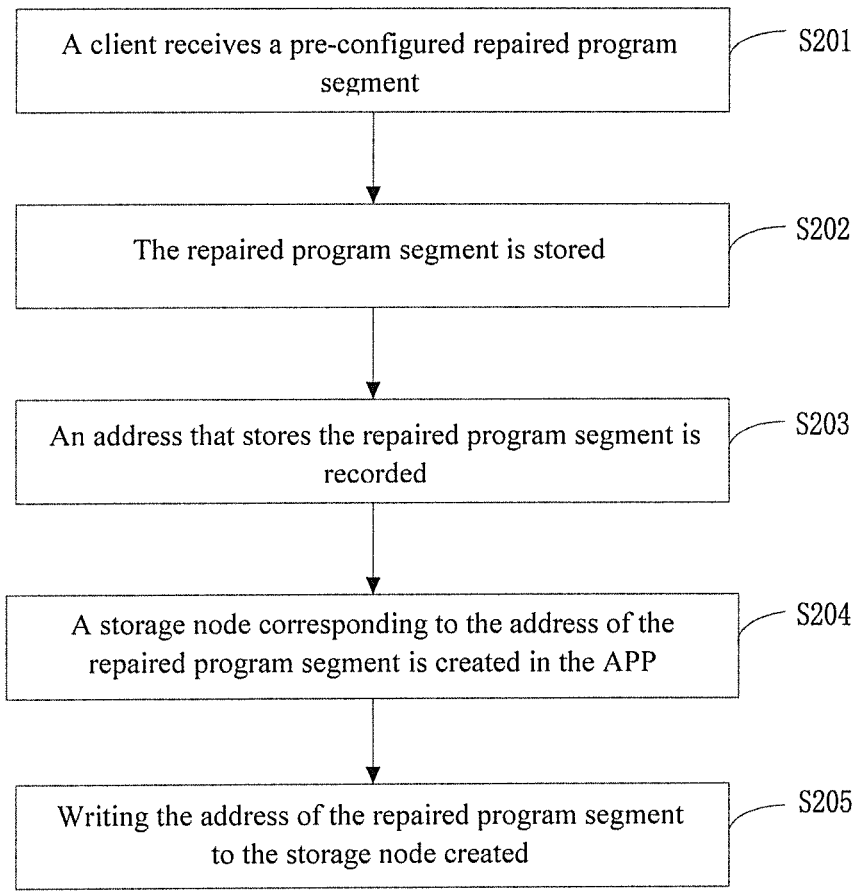
FIG. 2 is a flowchart of a second implementation mode of a method for dynamically repairing an application according to one or more embodiments of the present invention.

Please refer to FIG. 2. FIG. 2 is a flowchart of a second implementation mode of a method for dynamically repairing an application according to one or more embodiments of the present invention. This embodiment will describe the operation of adding a program segment. The method of this embodiment includes the following steps.

Step S201: a client receives a pre-configured repaired program segment.

Based on the description of the above embodiment, it can be known that the repaired program segment is a collection of method program segments and includes at least one program segment corresponding to a complete method. Therefore, in order to clarify the operation that the client needs to perform on each repaired program segment, the server pre-adds the operation instructions for each repaired program segment, and the operation instructions may be represented by numbers or letters, which is not limited in the embodiments of the present invention. After the client receives the repaired program segment, it can perform the corresponding operation on the address of the repaired program segment according to the operation instructions.

Step S202, store the repaired program segment.

Step S203, record an address that stores the repaired program segment.

Step S204, create a storage node corresponding to the address of the repaired program segment in the APP.

According to the above description, it can be known that the address in the APP forms a subordinate relationship through the storage nodes. When adding a program segment to an APP, the address of the repaired program segment needs to be written into its corresponding storage node. Because the added program segment is a new program segment, there is no such a storage node for writing the address of the repaired program segment in the APP. As a result, before storing the address of the repaired program segment in the APP, it is necessary to create a storage node corresponding to the address of the repaired program segment.

Since the repaired program segment belongs to a certain functional module, the storage node corresponding to the address of the repaired program segment is a sub-storage node of the storage node corresponding to the address of the functional module. The client can find the address of the functional module according to the identification information of the repaired program segment, and then determine its corresponding storage node according to the address of the functional module. Then, the client can add a new sub-storage node using the storage node corresponding to the address of the functional module as a root node. The new sub-storage node is the storage node corresponding to the address of the added repaired program segment.

It should be noted that the storage node may be a tag of a storage location. Therefore, the process of creating a storage node is a process of determining a storage location and adding a tag at the determined storage location. Specifically, the foregoing process is a technical means well known to a person skilled in the art, and therefore this part of the embodiments of the present invention will not be described in detail herein.

Step S205: write the address of the repaired program segment to the storage node created.

Based on the above steps, after creating the storage node, the APP packages the created storage node in a preset package format and then sends it to the JS platform. After the storage node is learned by the JS platform, the JS platform sends a command to the APP to write the address of the repaired program segment in the storage node, so as to complete the storage of the address of the repaired program segment.

According to the description of this embodiment, it can be known that when adding a program segment to the APP, it is not necessary to modify the execution program corresponding to the APP, and only a new storage node may be added in the APP, so that the modification to the IOS system can be avoided, and the repaired program is dynamically added to the APP.

In the above embodiment, the technical solution of the embodiment of the present invention is described based on the scenario of adding a program segment. In addition, the technical solution of the embodiment also includes scenarios of modifying a program segment and deleting a program segment. The following embodiments will describe the technical solution based on the scenarios of modifying a program segment and deleting a program segment.

Figure 3:
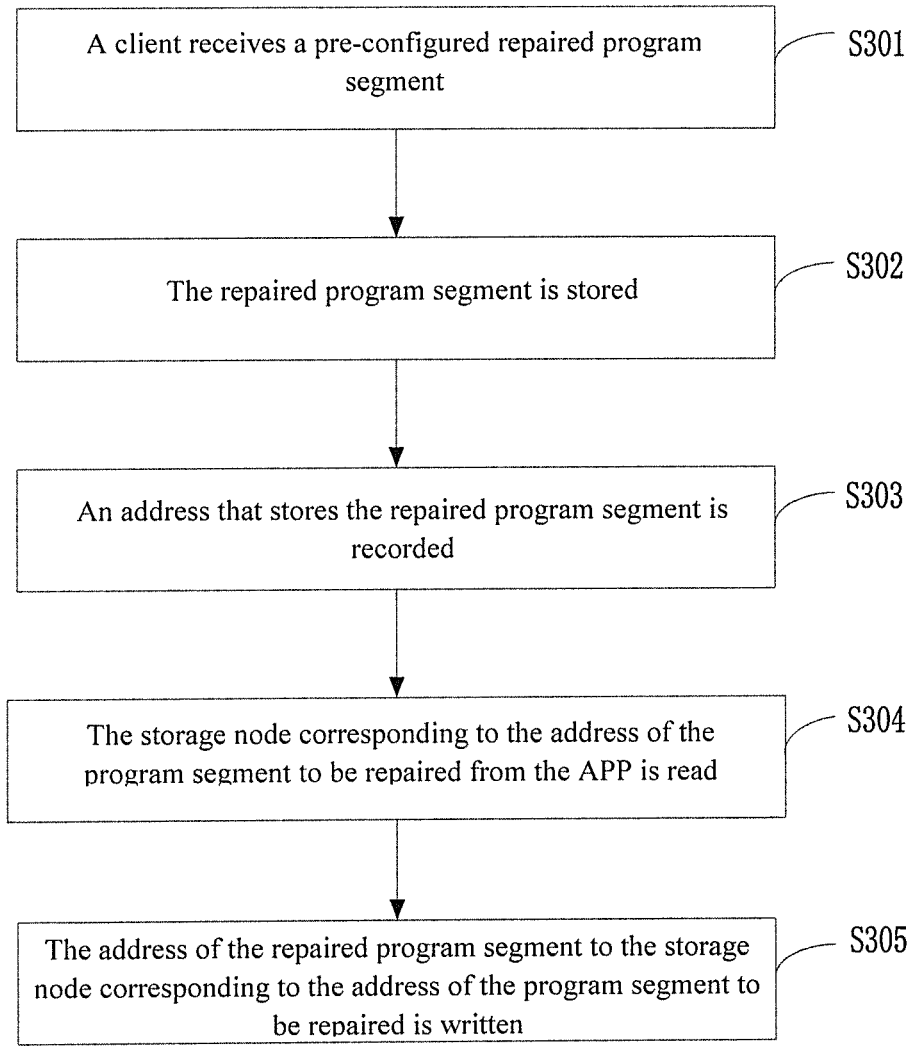
FIG. 3 is a flowchart of a third implementation mode of a method for dynamically repairing an application according to one or more embodiments of the present invention.

Please refer to FIG. 3. FIG. 3 is a flowchart of a third implementation mode of a method for dynamically repairing an application according to one or more embodiments of the present invention. This method includes the following steps.

Step S301, a client receives a pre-configured repaired program segment.

In this embodiment, when the program segment is modified, the JS platform replaces the original program segment executed by the APP with a new program segment by way of replacing the segment to be repaired with the repaired program segment. Therefore, the operation instruction of the repaired program segment received by the client is a "replacement" instruction.

In addition, it should be noted that when a certain program segment is deleted, since the program segment to be deleted does not have a corresponding repaired program segment, the corresponding repaired program segment for the program segment to be deleted can be regarded as empty. The server may send only the identification information of the program segment to be deleted and a "replacement" operation instruction to the client.

Step S302, store the repaired program segment.

Step S303, record an address that stores the repaired program segment.

Since the repaired program segment corresponding to the program segment to be deleted is empty, there is no address corresponding to the repaired program segment. Hence, the repaired program address of the program to be deleted is also empty, and an empty memory address can be represented by "0".

Step S304, read the storage node corresponding to the address of the program segment to be repaired from the APP.

When deleting a program segment and replacing a program segment, the APP stores the address of the program segment to be repaired before the repair. Therefore, after receiving the address of the repaired program segment, the JS platform needs to send a command to the APP to find the storage node corresponding to the address of the program segment to be repaired. After the APP receives the command, it can find the address of the corresponding functional module according to the identification information of the repaired program segment, and then can determine the storage node corresponding to the address of the functional module. Because the program segment to be repaired is a subroutine segment of the functional module, the storage node of the address of the program segment to be repaired can be found in the determined sub-storage nodes of the storage node. Similarly, after finding the storage node of the address of the program segment to be repaired, the APP packages this storage node in the preset package format and then sends it to the JS platform.

It should be noted that in the OC language program, most of the method program segments are stored in the form of a list. The method program segment is pointed to by a pointer in the list. The pointer to the method program segment is the address of the method program. The above method for finding a storage node in an APP is based on the description of this scenario.

However, in the OC language program, it also includes some method programs that need to be executed directly, for example, the super method and the self method. This type of program does not have an address in the APP, so there is no storage node thereof. As a result, when the program segment to be repaired is such type of program, the APP first searches for a corresponding functional module according to the identification information, and after finding the program segment to be repaired from the program segment corresponding to the functional module, adds a read path for the program segment to be repaired. The read path is the address of the program segment to be repaired. The storage node corresponding the added address in the APP is the storage node to be sent to the JS platform.

Step S305, write the address of the repaired program segment to the storage node corresponding to the address of the program segment to be repaired.

As can be known from the above description, in this embodiment, the program segment to be repaired is repaired by means of replacing the address of the program segment to be repaired with the address of the repaired program segment. When the address of the repaired program segment is written into the APP, the address of the program segment to be repaired is overwritten by the address of the repaired program segment, so that when the APP is executed, the program segment to be repaired cannot be called through the address of the program segment to be repaired, so as to complete the repair.

When the repair operation of the APP is to delete a program segment, the repair process is the same as the above process. Since the address of the repaired program segment is "0", the address of the repaired program segment does not point to any program segment after the repair, so that neither the program segment to be repaired nor the other program can be called during the execution of the APP, which is equivalent to having deleted the program to be repaired.

It can be known from the description of this embodiment that by replacing the address of the program segment to be repaired with the address of the repaired program segment, the program segment to be repaired can be replaced on the basis of not issuing a new program, so that it can be completed under the condition that the APP is dynamically running. This avoids the time needed for taking the APP offline, repairing it, and then reapproving the repaired APP. In this way, the present invention can reduce the cost of the APP. Optionally, this can also reduce the crash rate. Hence, the present invention can improve the user experience.

The foregoing embodiment describes the technical content of the solution from the perspective of the client. To make a person skilled in the art have a more complete view for understanding of the solution, the solution of the present invention will be further described from the perspective of the server.

Figure 4:
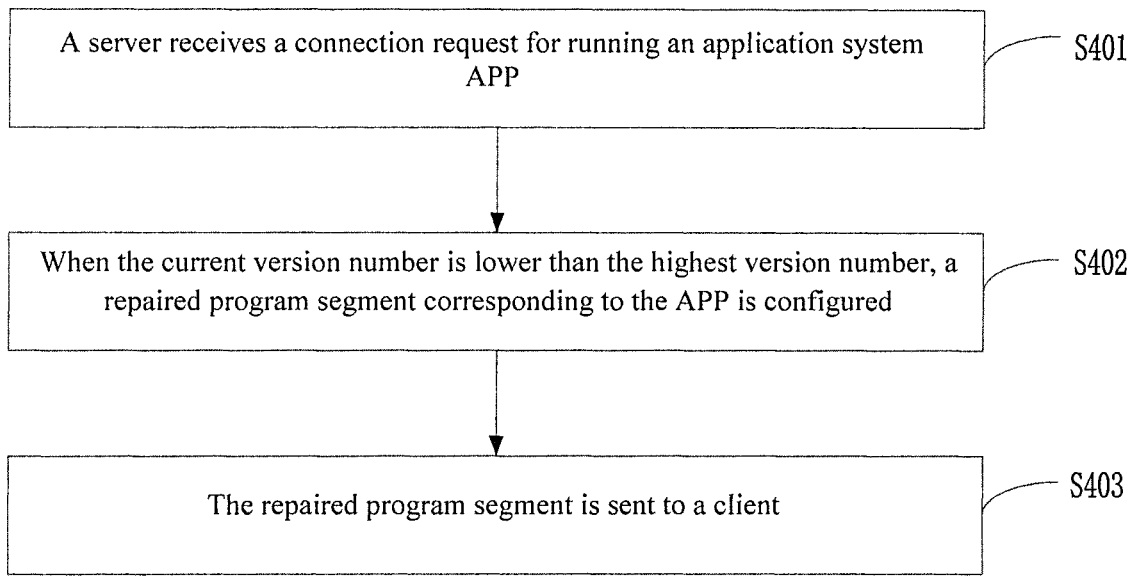
FIG. 4 is a flowchart of a fourth implementation mode of a method for dynamically repairing an application according to one or more embodiments of the present invention.

Please refer to FIG. 4. FIG. 4 is a flowchart of a fourth implementation mode of a method for dynamically repairing an application according to one or more embodiments of the present invention. This method includes the following steps.

Step S401, a server receives a connection request for running an application system APP.

When a user clicks the running APP on the client, the APP sends a connection request to its corresponding server through the client. The connection request includes the version number of the APP to be executed, and the server can determine whether the pending APP needs to be repaired based on the version number of the APP to be executed.

Step S402, when the current version number is lower than the highest version number, configure a repaired program segment corresponding to the APP.

The version number is the version identifier of each generation of APP. The engineering staff can understand the function provided by each generation of APP through the version number. Each version of the APP is an improvement over the previous version of the APP. When the server reads the version number of the APP to be executed by the client, it can determine whether the pending APP needs to be repaired by determining whether its version number is the highest version number. If the version number is the highest version number, it is considered that the APP currently running on the client does not need to be repaired, and the server can return the normal running information to the client. If the version number is not the highest version number, the APP currently to be run needs to be repaired, and the server configures a repaired program segment regarding the version number of the APP, so that the client can repair the APP to be run according to the repaired program segment.

Since the development and maintenance of the APP are all completed on the server side, the server stores programs corresponding to each version of the APP. Therefore, in this embodiment, the server may obtain all of the APP programs whose version numbers are higher than the version number of the client APP. The server may acquire the program segments of the APP of the high version number that is different from the client APP one by one in the order of the version number from the lowest to the highest, and then add the identification information for each program segment according to the attribute information, so as to obtain the repaired program segment.

For example, the client runs a browser version number of 5.1.0, and the browser's highest version number is 5.1.3. After the server receives a request from the browser with the version number 5.1.0 running on the client, the server obtains C browser programs with version numbers 5.1.1, 5.1.2, and 5.1.3, and respectively obtains the different program segments between the browser with the version number of 5.1.0 and the browser with the version number of 5.1.1, between the browser with the version number of 5.1.1 and the browser with the version number of 5.1.2, as well as between the browser with the version number of 5.1.2 and the browser with the version number of 5.1.3. The server adds the identification information to the program segment according to the attribute value of each program segment, so as to form the repaired program segment for the browser whose version number is 5.1.0.

It should be noted that, in order to reduce the steps of configuring the repaired program segment and improve the efficiency of configuring the repaired program segment, the engineering staff may distinguish the APP of this version from the previous version of the same APP every time a new version of the APP is developed by means of separately storing these distinguishing program segments, so that when the server needs to configure a repaired program segment, the repaired program segment can be obtained directly.

In addition, in order to facilitate the client's repair platform to identify and process the repaired program segments, the server can use the same language as the repair platform programming language to write. For example, in the present embodiment, since the repair platform is written using JavaScript code, the server can also use the JavaScript code to write the repaired program segment.

Step S403, send the repaired program segment to a client.

After the server configuration completes the repaired program segment, the repaired program segment is sent to the client, and the client is going to repair the currently running APP. For details, see the description of the above embodiments, which will not be repeated in this embodiment of the present invention.

In light of the foregoing, it can be seen that, according to the method for dynamically repairing an application provided by the embodiment of the present invention, when the APP needs to be repaired, the client receives the repaired program segment pre-configured by the server. After storing the repaired program segment, the client records the address of the repaired program segment and stores the address of the repaired program segment in the APP. During running of the APP, the repaired program segment is found by the address of the repaired program segment, and the repaired program section is then executed. Therefore, compared with the prior art, the technical solutions of the embodiments of the present invention can repair the APP online, thereby avoiding the time consumed by making the application offline, repairing it, and then reapproving the repaired APP. As a result, this is able to reduce the cost of the APP. Optionally, the present invention is able to reduce the crash rate. In addition, it also can improve the user experience.

Figure 5:
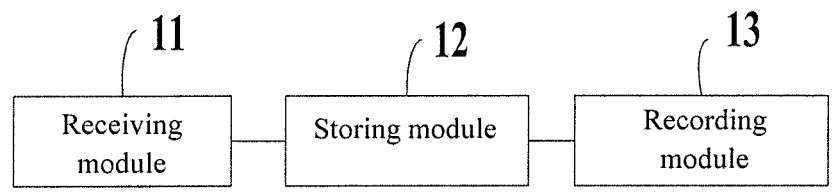
FIG. 5 is a schematic view of the device for dynamically repairing an application according to one or more embodiments of the present invention.

Corresponding to the foregoing implementation method, an embodiment of the present invention further provides a device for dynamically repairing an application. Please refer to FIG. 5. FIG. 5 is a schematic view of the device for dynamically repairing an application according to one or more embodiments of the present invention. This embodiment will describe the device structure of the client.

The device includes a receiving module 11, a storing module 12 and a recording module 13, in which the receiving module 11 is used for receiving a pre-configured repaired program segment; the storing module 12 is used for storing the repaired program segment received by the receiving module 11; the recording module 13 is used for recording the address of the repaired program segment stored by the storing module 12. In this embodiment of the present invention, the storing module 12 is further configured to store the address of the repaired program segment recorded by the recording module 13 in the application program APP, and the APP program calls the repaired program segment through the address of the repaired program segment.

For the implementation processes of the functions and effects of each module in the device, please refer to the corresponding implementation process in the foregoing method, and the details are not described herein again.

It can be known from the description of this embodiment that, by setting the repair platform in the APP, the solution can receive the repaired program segment for execution without violating the IOS development rules and dynamically repair the APP according to the repaired program segment, thereby being able to avoid the time it needs for taking the APP offline, repairing it, and then re-approving the repaired APP.

It should be noted that, in this embodiment, the storing module 12 includes a creating unit and a writing unit, in which the creating unit is used for creating a storage node corresponding to the address of the repaired program segment in the APP; and the writing unit is used for writing the address of the repaired program segment to the storage node created.

In this embodiment, the creating unit includes a first reading sub-unit, a first searching sub-unit, a first determining sub-unit, and a first adding sub-unit, in which the first reading sub-unit is used for reading the identification information of the repaired program segment; the first searching sub-unit is used for searching the APP for the address of a functional module to which the repaired program belongs according to the identification information; the first determining sub-unit is used for determining a storage node corresponding to the address of the functional module; and the first adding sub-unit is used for adding a sub-storage node to the storage node corresponding to the address of the functional module, and using the sub-storage node as the storage node of the address of the repaired program segment.

In another embodiment, the storing module further includes a reading unit, in which the reading unit is used for reading the storage node corresponding to the address of the program segment to be repaired from the APP, wherein the program segment to be repaired is a program segment prior to the repaired program segment. In addition, in this embodiment, the writing unit is further used for writing the address of the repaired program segment to the storage node corresponding to the address of the program segment to be repaired, such that the address of the program segment to be repaired is replaced by the address of the repaired program segment.

In this embodiment, the reading unit includes a second reading sub-unit, a second searching sub-unit and a second determining sub-unit, in which the second reading sub-unit is used for reading the identification information of the repaired program segment; the second searching sub-unit is used for searching the APP for the address of the functional module to which the repaired program belongs according to the identification information; the second determining sub-unit is used for determining the storage node corresponding to the address of the functional module; and the second searching sub-unit is further used for searching the storage node corresponding to the address of the program to be repaired from the sub-storage node using the storage node corresponding to the address of the functional module as a root storage node.

On the basis of the foregoing embodiment, in another embodiment, the reading unit includes a second adding sub-unit, in this embodiment, the second searching sub-unit is further used for searching for the functional module to which the repaired program segment belongs according to the identification information; the second determining sub-unit is used for determining the program segment to be repaired from the functional module; the second adding sub-unit is used for adding a storage address to the program segment to be repaired; and the second determining sub-unit is further used for determining that the storage node corresponding to the storage address of the added program segment to be repaired is the storage node corresponding to the address of the program segment to be repaired.

For the implementation process of the function and effect of each module and unit in this device, please refer to the corresponding implementation process in the above method, which will not be repeated here.

In light of the foregoing, it can be seen that the device for dynamically repairing an application is provided in the embodiment of the present invention; when compared with the prior art, the technical solutions of the embodiments of the present invention can repair the APP online, thereby avoiding the time consumed by taking the application offline, repairing it, and then reapproving the repaired APP. As a result, this is able to reduce the cost of the APP. Optionally, the present invention is able to reduce the crash rate. In addition, it also can improve the user experience.

The foregoing embodiment describes the device in the solution from the perspective of the client. To give a person skilled in the art a more complete view of the solution, the device is described below from the perspective of the server.

Figure 6:
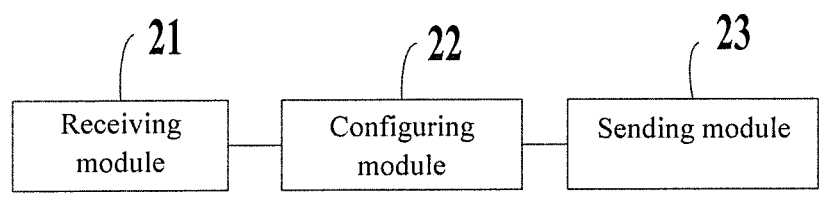
FIG. 6 is a schematic view of a second implementation mode of the device for dynamically repairing an application according to one or more embodiments of the present invention.

Please refer to FIG. 6. FIG. 6 is a schematic view of a second implementation mode of the device for dynamically repairing an application according to one or more embodiments of the present invention. The device includes a receiving module 21, a configuring module 22 and a sending module 23, in which the receiving module 21 is used for receiving a connection request for running an application system APP, where the connection request comprises a current version number of the APP; the configuring module 22 is used for configuring a repaired program segment corresponding to the APP, when the current version number is lower than the highest version number; and the sending module 23 is used for sending the repaired program segment to a client.

In this embodiment, the configuring module includes an obtaining unit, an adding unit, and a determining unit, in which the obtaining unit is used for sequentially obtaining a different program segment from the APP from an APP whose version number is higher than the current version number; the adding unit is used for adding identification information to the program segment according to an attribute value thereof; and the determining unit is used for determining the program segment with the added identification information to be the repaired program segment.

For the implementation process of the function and effect of each module and unit in this device, please refer to the corresponding implementation process in the above method, which will not be repeated here.

In light of the foregoing, it can be seen that, according to the device for dynamically repairing an application provided by the embodiment of the present invention, when the APP needs to be repaired, the client receives the repaired program segment pre-configured by the server. After storing the repaired program segment, the client records the address of the repaired program segment and stores the address of the repaired program segment in the APP. During the running of the APP, the repaired program segment is found by the address of the repaired program segment, and the repaired program section is then executed. Therefore, compared with the prior art, the technical solutions of the embodiments of the present invention can repair the APP online, thereby avoiding the time consumed by taking the application offline, repairing it, and then reapproving the repaired APP. As a result, this is able to reduce the cost of the APP. Optionally, the present invention is able to reduce the crash rate. In addition, it also can improve the user experience.

Figure 7:
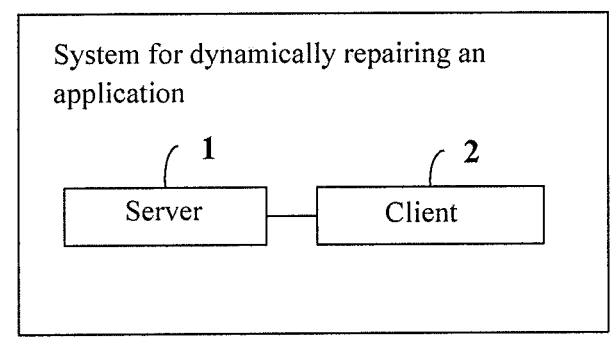
FIG. 7 is a schematic view of the system for dynamically repairing an application according to one or more embodiments of the present invention.

Corresponding to the foregoing implementation method and device, an embodiment of the present invention further provides a system for dynamically repairing an application. Please refer to FIG. 7. FIG. 7 is a schematic view of the system for dynamically repairing an application according to one or more embodiments of the present invention. The system includes a server 1 and a client 2, in which the server 1 is used for receiving a connection request for running an application system APP sent from the client 2, where the connection request comprises a current version number of the APP; when the current version number is lower than the highest version number, configuring a repaired program segment corresponding to the APP, and sending the repaired program segment to the client 2; the client 2 is used for receiving a repaired program segment pre-configured by the server 1; storing the repaired program segment; recording an address that stores the repaired program segment; storing the address of the repaired program segment to the APP, so as to facilitate calling the repaired program segment via the address of the repaired program segment when the APP is running.

It should be noted that the specific operation process and structure of the server 1 and the client 2 are described in detail in the foregoing embodiment and will not be described in this embodiment of the present invention.

In summary, the embodiments of the present invention provide a method, a device, and a related system for dynamically repairing an application. When the APP needs to be repaired, the client receives the repaired program segment pre-configured by the server. After storing the repaired program segment, the client records the address of the repaired program segment and stores the address of the repaired program segment in the APP. During the running of the APP, the repaired program segment is found by the address of the repaired program segment and the repaired program section is then executed. Therefore, compared with the prior art, the technical solutions of the embodiments of the present invention can repair the APP online, thereby avoiding the time consumed by taking the application offline, repairing it, and then reapproving the repaired APP. As a result, this is able to reduce the cost of the APP. Optionally, the present invention is able to reduce the crash rate. In addition, the embodiments of the present invention also can improve the user experience.

The above description is only a few specific embodiments of the present invention. It should be pointed out that for a person skilled in the art, a number of improvements and modifications can be made without departing from the principle of the present invention. These improvements and modifications should be regarded as within the protection scope of the present invention.

The invention claimed is:

1. A method for dynamically repairing an application, wherein the method comprises:
   receiving, by a client, a repaired program segment for the application installed on the client, wherein a repair platform is pre-installed within the application and on the client, wherein the repair platform is associated with a first programming language different from a second programming language associated with the application;
   storing the repaired program segment by the repair platform within the application, comprising:
      converting, by the repair platform, the repaired program segment from the first programming language into an application-recognizable format associated with the second programming language;
      recording an address that stores the repaired program segment;
      storing the address of the repaired program segment in the application, comprising:
         creating a storage node corresponding to the address of the repaired program segment in the application, comprising:
            reading identification information of the repaired program segment;
            searching the application for an address of a functional module to which the repaired program segment belongs according to the identification information, wherein the functional module indicates a class to which the repaired program segment belongs;
            determining a storage node corresponding to the address of the functional module;
            adding a sub-storage node to the storage node corresponding to the address of the functional module; and
            using the sub-storage node as the storage node of the address of the repaired program segment; and
         writing the address of the repaired program segment to the storage node created; and
   in response to determining that the application is in operation, calling, by the repair platform, the repaired program segment via the address of the repaired program segment.

2. The method according to claim 1, wherein storing the address of the repaired program segment in the application further comprises:
   reading a storage node corresponding to an address of a program segment to be repaired from the application, wherein the program segment to be repaired is a program segment prior to the repaired program segment; and
   writing the address of the repaired program segment to the storage node corresponding to the address of the program segment to be repaired, such that the address of the program segment to be repaired is replaced by the address of the repaired program segment.

3. The method according to claim 2, wherein reading the storage node corresponding to the address of the program segment to be repaired from the application comprises:
   reading identification information of the repaired program segment;
   searching the application for an address of a functional module to which the repaired program segment belongs according to the identification information, wherein the functional module indicates a class to which the repaired program segment belongs;
   determining the storage node corresponding to the address of the functional module; and
   searching the storage node corresponding to the address of the program segment to be repaired from a sub-storage node using the storage node corresponding to the address of the functional module as a root storage node.

4. The method according to claim 2, wherein reading the storage node corresponding to the address of the program segment to be repaired from the application comprises:
   reading identification information of the repaired program segment;
   searching for a functional module to which the repaired program segment belongs according to the identification information, wherein the functional module indicates a class to which the repaired program segment belongs;
   determining the program segment to be repaired from the functional module;
   adding a storage address to the program segment to be repaired; and
   determining that the storage node corresponding to the added storage address of the program segment to be repaired is the storage node corresponding to the address of the program segment to be repaired.

5. The method according to claim 1, wherein an operating system associated with the client is an IOS system, wherein the repair platform in the application is configured to be written in a modifiable programming language of the IOS system and is configured to provide an environment for calling OC language code.

6. The method according to claim 1, wherein calling, by the repair platform, the repaired program segment via the address of the repaired program segment further comprises:
   packing, by the application, the repaired program segment according to a preset format; and
   sending, by the application, the repaired program segment to the repair platform.

7. A method for dynamically repairing an application, wherein the method comprises:
   receiving, by a server and from a client, a connection request for running the application installed on the client, wherein the connection request comprises a current version number of the application;
   in response to determining that the current version number is lower than the highest version number, configuring a repaired program segment corresponding to the application, wherein the repaired program segment is associated with a first programming language different from a second programming language associated with the application;
   sending the repaired program segment to the client, wherein the client stores the repaired program segment by a repair platform associated with the first programming language and pre-installed within the application on the client, comprising:
      causing the repair platform to convert the repaired program segment from the first programming language into an application-recognizable format associated with the second programming language;
      obtaining an address for storing the repaired program segment; and storing the address of the repaired program segment to the application, so as to facilitate the client calling the repaired program segment by the repair platform via the address of the repaired program segment when the application is running, comprising:

creating a storage node corresponding to the address of the repaired program segment in the application, comprising:

reading identification information of the repaired program segment;

searching the application for an address of a functional module to which the repaired program segment belongs according to the identification information, wherein the functional module indicates a class to which the repaired program segment belongs;

determining a storage node corresponding to the address of the functional module;

adding a sub-storage node to the storage node corresponding to the address of the functional module; and using the sub-storage node as the storage node of the address of the repaired program segment; and writing the address of the repaired program segment to the storage node created.

8. The method according to claim 7, wherein configuring the repaired program segment corresponding to the application comprises:

sequentially obtaining a different program segment from the application from an application whose version number is higher than the current version number;

adding identification information to the program segment according to an attribute value thereof; and determining the program segment with the added identification information to be the repaired program segment.

9. The method according to claim 7, wherein the client's operating system is IOS system.

10. The method according to claim 9, wherein the repair platform in the application is configured to be written in a modifiable programming language of the IOS system and is configured to provide an environment for calling OC language code.

11. A device for dynamically repairing an application, wherein the device comprises:

a receiving module for receiving a repaired program segment for the application installed on the device, wherein a repair platform is pre-installed within the application and on the device, wherein the repair platform is associated with a first programming language different from a second programming language associated with the application;

a storing module for storing the repaired program segment received by the receiving module through the repair platform within the application, comprising:

converting, by the repair platform, the repaired program segment from the first programming language into an application-recognizable format associated with the second programming language; and a recording module for recording an address of the repaired program segment stored by the storing module; wherein the storing module is further configured to store the address of the repaired program segment recorded by the recording module in the application, wherein the repair platform of the application calls the repaired program segment through the address of the repaired program segment, wherein the recording module is configured to:

create a storage node corresponding to the address of the repaired program segment in the application, wherein the recording module is configured to:

read identification information of the repaired program segment;

search the application for an address of a functional module to which the repaired program segment belongs according to the identification information, wherein the functional module indicates a class to which the repaired program segment belongs;

determine a storage node corresponding to the address of the functional module;

add a sub-storage node to the storage node corresponding to the address of the functional module; and use the sub-storage node as the storage node of the address of the repaired program segment; and write the address of the repaired program segment to the storage node created.

12. The device according to claim 11, wherein the storing module comprises a creating unit and a writing unit, wherein:

the creating unit is configured to create a storage node corresponding to the address of the repaired program segment in the application; and the writing unit is configured to write the address of the repaired program segment to the storage node created.

13. The device according to claim 12, wherein the storing module further comprises a reading unit, wherein the reading unit is configured to read the storage node corresponding to the address of a program segment to be repaired from the application, wherein the program segment to be repaired is a program segment prior to the repaired program segment; and the writing unit is further configured to write the address of the repaired program segment to the storage node corresponding to the address of the program segment to be repaired, such that the address of the program segment to be repaired is replaced by the address of the repaired program segment.

14. The device according to claim 12, wherein the creating unit comprises a first reading sub-unit, a first searching sub-unit, a first determining sub-unit, and a first adding sub-unit, wherein:

the first reading sub-unit is configured to read identification information of the repaired program segment;

the first searching sub-unit is configured to search the application for the address of a functional module to which the repaired program segment belongs according to the identification information, wherein the functional module indicates a class to which the repaired program segment belongs;

the first determining sub-unit is configured to determine a storage node corresponding to the address of the functional module; and the first adding sub-unit is configured to add a sub-storage node to the storage node corresponding to the address of the functional module, and use the sub-storage node as the storage node of the address of the repaired program segment.

15. The device according to claim 13, wherein the reading unit comprises a second reading sub-unit, a second searching sub-unit, and a second determining sub-unit, wherein:

the second reading sub-unit is configured to read identification information of the repaired program segment;

the second searching sub-unit is configured to search the application for the address of a functional module to which the repaired program segment belongs according to the identification information, wherein the functional module indicates a class to which the repaired program segment belongs;

the second determining sub-unit is configured to determine the storage node corresponding to the address of the functional module; and the second searching sub-unit is further configured to search the storage node corresponding to the address of the program segment to be repaired from a sub-storage node using the storage node corresponding to the address of the functional module as a root storage node.

16. The device according to claim 15, wherein the reading unit comprises a second adding sub-unit, wherein:

the second searching sub-unit is further configured to search for the functional module to which the repaired program segment belongs according to the identification information;

the second determining sub-unit is configured to determine the program segment to be repaired from the functional module;

the second adding sub-unit is configured to add a storage address to the program segment to be repaired; and the second determining sub-unit is configured to determine that the storage node corresponding to the added storage address of the program segment to be repaired to be the storage node corresponding to the address of the program segment to be repaired.

17. The device according to claim 11, wherein the client's operating system is IOS system.

18. The device according to claim 17, wherein the repair platform in the application is configured to be written in a modifiable programming language of the IOS system and is configured to provide an environment for calling OC language code.

19. A device for dynamically repairing an application, wherein the device comprises:

a receiving module configured to receive, from a client, a connection request for running the application installed on the client, wherein the connection request comprises a current version number of the application;

a configuring module configured to configure a repaired program segment corresponding to the application when the current version number is lower than the highest version number, wherein the repaired program segment is associated with a first programming language different from a second programming language associated with the application; and a sending module configured to send the repaired program segment to the client, wherein the client stores the repaired program segment by a repair platform pre-installed within the application and on the client, wherein the repair platform is associated with the first programming language and converts the repaired program segment from the first programming language into an application-recognizable format associated with the second programming language, wherein the sending module is configured to:

create a storage node corresponding to the address of the repaired program segment in the application, wherein the sending module is configured to:
read identification information of the repaired program segment;

search the application for an address of a functional module to which the repaired program segment belongs according to the identification information, wherein the functional module indicates a class to which the repaired program segment belongs;

determine a storage node corresponding to the address of the functional module;

add a sub-storage node to the storage node corresponding to the address of the functional module; and use the sub-storage node as the storage node of the address of the repaired program segment; and write the address of the repaired program segment to the storage node created.

20. The device according to claim 19, wherein the configuring module comprises: an obtaining unit, an adding unit, and a determining unit, wherein:

the obtaining unit is configured to sequentially obtain a different program segment from the application from an application whose version number is higher than the current version number;

the adding unit is configured to add identification information to the program segment according to an attribute value thereof; and the determining unit is configured to determine the program segment with the added identification information to be the repaired program segment.

21. The device according to claim 19, wherein the client's operating system is IOS system.

22. The device according to claim 21, wherein the repair platform in the application is configured to be written in a modifiable programming language of the IOS system and is configured to provide an environment for calling OC language code.

23. A system for dynamically repairing an application, wherein the system comprises:

a server comprising at least a first processor and at least a first non-transitory memory; and a client in electronic communication with the server, wherein the client comprises at least a second processor and at least a second non-transitory memory, wherein the server is configured to receive a connection request for running the application installed on the client, wherein the connection request comprises a current version number of the application, wherein when the current version number is lower than the highest version number, the server is further configured to configure a repaired program segment corresponding to the application, and send the repaired program segment to the client, wherein the repaired program segment is associated with a first programming language different from a second programming language associated with the application;

the client is configured to receive the repaired program segment, store the repaired program segment by a repair platform associated with the first programming language and pre-installed within the application on the client, convert, by the repair platform, the repaired program segment from the first programming language into an application-recognizable format associated with the second programming language, record an address that stores the repaired program segment, store the address of the repaired program segment to the application, so as to facilitate calling the repaired program segment by the repair platform and via the address of the repaired program segment when the application is running, wherein the client is configured to:

create a storage node corresponding to the address of the repaired program segment in the application, wherein the sending module is configured to:
- read identification information of the repaired program segment;
- search the application for an address of a functional module to which the repaired program segment belongs according to the identification information, wherein the functional module indicates a class to which the repaired program segment belongs;
- determine a storage node corresponding to the address of the functional module;
- add a sub-storage node to the storage node corresponding to the address of the functional module; and
- use the sub-storage node as the storage node of the address of the repaired program segment; and write the address of the repaired program segment to the storage node created.

24. The system according to claim 23, wherein the client's operating system is IOS system.

25. The system according to claim 24, wherein the repair platform in the application is configured to be written in a modifiable programming language of the IOS system and is configured to provide an environment for calling OC language code.

* * * * *